UNITED STATES PATENT OFFICE.

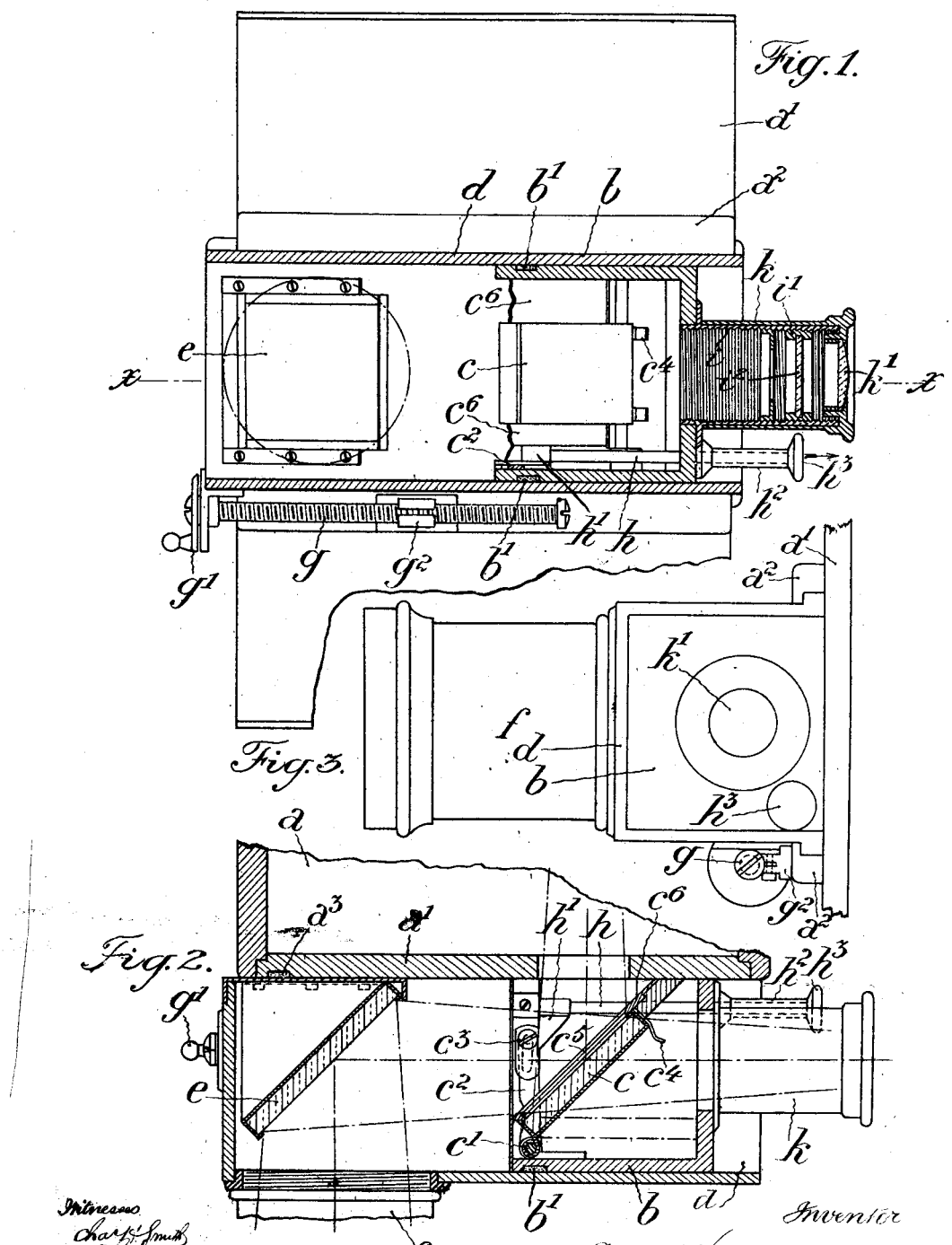

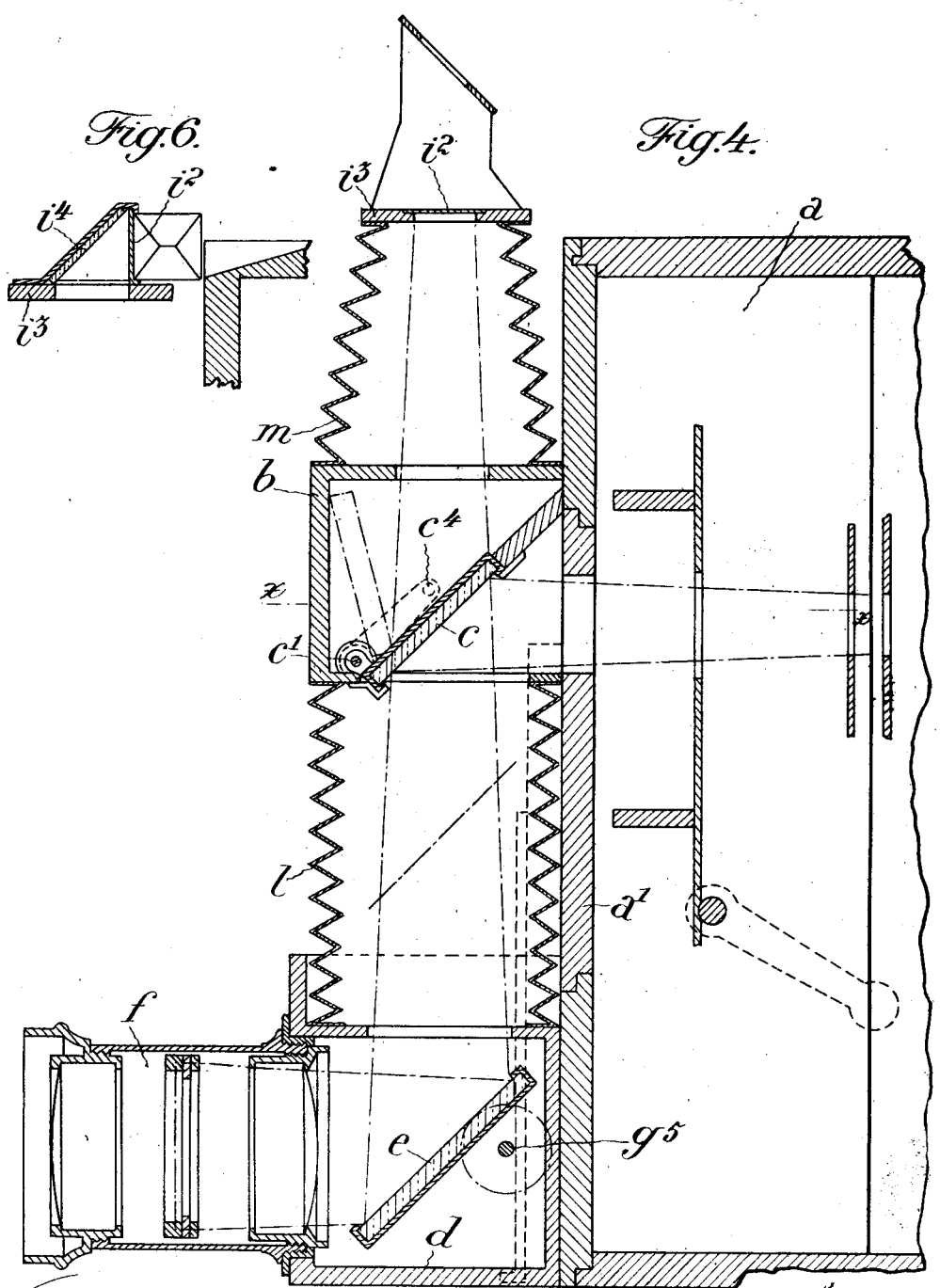

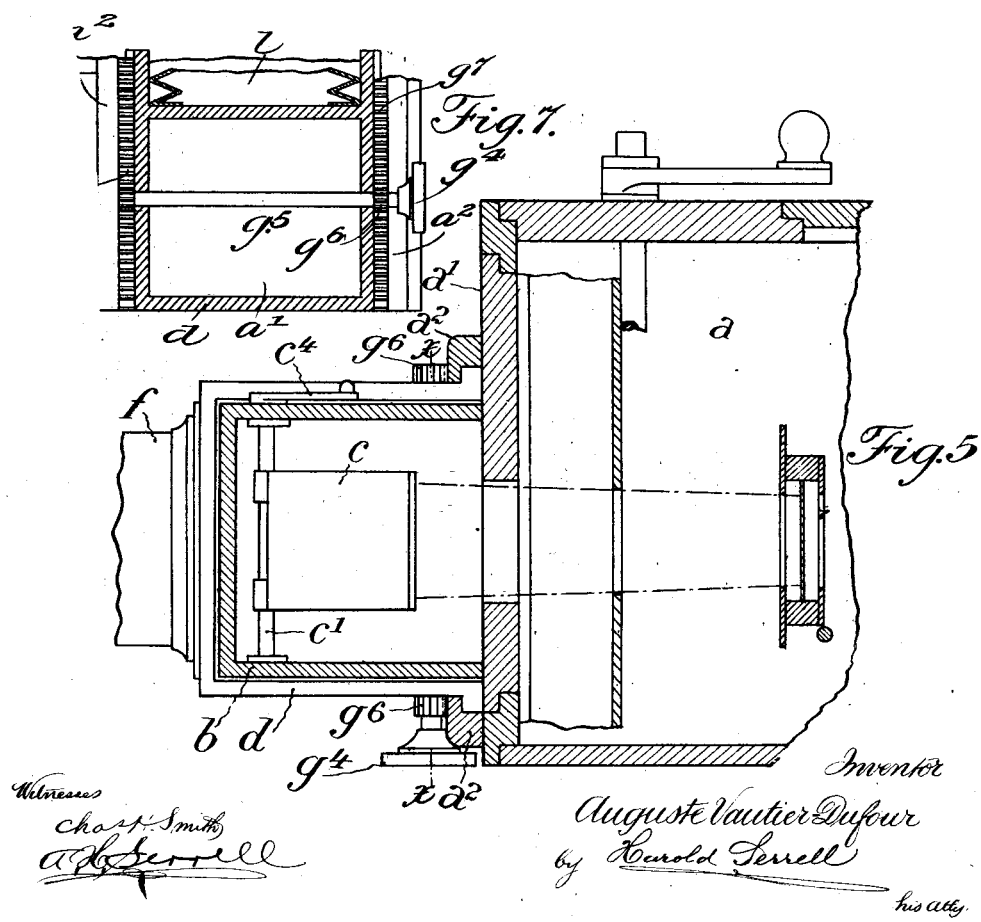

AUGUSTE VAUTIER-DUFOUR, OF GRANDSON, SWITZERLAND.

PHOTOGRAPHIC CAMERA.

1,051,034.

Specification of Letters Patent. Patented Jan. 21, 1913.

Application filed January 26, 1911. Serial No. 604,773.

*To all whom it may concern:*

Be it known that I, AUGUSTE VAUTIER-DUFOUR, manufacturer, a citizen of Switzerland, residing at Grandson, Canton of Vaud, in the Confederation of Switzerland, have invented certain new and useful Improvements in and Relating to Photographic Cameras, of which the following is a specification.

The present invention relates to a photographic camera which is provided with mirrors which are interposed in the path of the rays of light coming from the objective to the photographic plate or film, in order to allow an objective of great focal length to be employed. According to the present invention, these mirrors are arranged so as to allow objectives of different focal lengths to be employed with the same camera. For this purpose, the mirror which receives the rays of light from the objective is placed so that it can be displaced together with the objective in a direction which is parallel to that of the axis of the pencil of the rays of light which are reflected by this mirror and so that it can be moved toward or away from the other mirror in order to produce a variation of the length of the path along which travel the rays of light from the objective to the focusing screen or to the photographic plate or film. This arrangement can, for instance, be advantageously employed for kinematographic cameras.

The accompanying drawings illustrate by way of example, two embodiments of the photographic camera, according to the present invention, and a variation of one of these embodiments.

In the drawing, Figure 1 is an elevation and partial central cross section illustrating the preferred form of my invention. Fig. 2 is a cross section and partial elevation taken on line $x$, $x$, Fig. 1. Fig. 3 is an end view of the form of the invention shown in Figs. 1 and 2. Fig. 4 is a central cross section illustrating a modified form of the invention. Fig. 5 is a cross section taken on line $x$, $x$, Fig. 4. Fig. 6 is a cross section illustrating a modified form of the focusing glass shown in Figs. 4 and 5, and Fig. 7 is a cross section on line $x$, $x$, Fig. 5.

In the first embodiment represented in Figs. 1 to 3, $a'$ designates a small board adapted to support the objective of a kinematographic camera $a$ of the usual type, of which only the anterior part is represented in Fig. 2. The board $a'$ supports a chamber or compartment $b$ in which a first mirror $c$ is placed. Furthermore it supports two guides $a^2$ on which a second chamber $d$ may slide, in which chamber a mirror $e$ is placed and which supports the objective $f$ and a screw $g$ which is provided with a disk carrying a handle $g'$ to turn the screw as desired in one or the other directions.

The screw $g$ passes through a screwed socket $g^2$ which is supported by one of the slides $a^2$. By turning the screw $g$, the chamber or compartment $d$ may be caused to slide on the guides $a^2$ and the mirror $e$ and the objective to move toward or away from the mirror $c$. The chamber $d$ surrounds the chamber $b$ on the three free sides of the same, the light being prevented from passing between the walls of these chambers by means of a packing $b'$ which is secured in the outer faces of the chamber $b$.

A packing $a^3$ prevents the passage of rays of light between the board $a'$ and the adjacent face of the chamber $d$. The mirrors $e$ and $c$ are placed parallel to each other at an inclination of 45° to the axis of the rays of light coming from the objective, and to the axis of the rays of light reflected to the sensitive surface, in such a manner that the position of the axis of the rays of light between the mirrors, remains fixed during the adjustments of the chamber $d$. These adjustments make it possible to vary the length of the path of the rays of light from the objective to the photographic plate or film and consequently objectives having different focal lengths may be employed.

The mirror $c$ is placed on a shaft $c'$ which is provided with an arm $c^2$. The latter supports a screw $c^3$ which passes through a groove provided in a plate $h'$ which is supported by a rod $h$. This rod can slide in a guiding pipe $h^2$ which is supported by the chamber $b$ and is provided outside the same with a button $h^3$ which, when it is pulled in the direction shown in Fig. 1, by the arrow from the position shown in this figure, moves the mirror $c$ backward in the chamber $b$ by overcoming the action of the springs $c^4$ which tend to maintain the mirror in its resting position shown in full lines, in which position its frame rests against the edges of an opening $c^5$ which serves for the passage of the rays of light and which is provided in an oblique plate $c^3$ arranged in the chamber $b$, in order to bring the mirror in the position shown in Fig. 2, by dash dotted lines.

On the chamber $b$ a tube $i$ is fixed which is provided inside with a screw-thread and in which a ring $i'$ is screwed, which supports a ground glass or focusing screen $i^2$. On the tube $i$ a second tube $k$ supporting a lens $k'$ can slide. The position of the ring $i'$ is regulated in such a manner that when the mirror $c$ is turned down backward, the ground surface of the glass $i^2$ is at the same distance from the objective as the sensitive surface which is in the camera $a$. It is therefore possible, after having brought the mirror $c$ to the position shown in Fig. 2, to focus, by observing, by means of the lens $k'$, the image which appears on the screen $i^2$.

In the embodiment shown in Figs. 4 and 5, the two chambers $b$ and $d$ instead of forming a tube of variable length, as in the foregoing embodiment, are connected by means of bellows $l$, and the displacement of the chamber $d$ can be produced by means of a button $g^4$ of a transverse shaft $g^5$ which is provided with pinions $g^6$ gearing with racks $g^7$ which are fixed on the slides $a^2$.

The backward movement of the mirror $c$ can be obtained by means of a handle $c^4$, which is supported by the shaft $c'$ of the mirror and is placed within the chamber $b$. The focusing screen $i^2$ is supported by a plate $i^3$ which is connected with the chamber $b$ by means of bellows $m$ and suitable supports which permit the plate $i^3$ to be turned against the chamber $b$ and are formed so that, when they are stretched, the focusing screen $i^2$ is at the same distance from the objective as the sensitive plate or film which is in the chamber.

As the pencil of rays of light coming from the objective is only once reflected between the objective and the focusing screen, the right side of the objects appears at the left side of the screen and vice-versa. In order to prevent this and to permit the focusing by looking in the direction of the object to be photographed and also to permit placing the apparatus in the same direction as the object, the plate $i^3$ can, as shown in Fig. 6, support a mirror $i^4$ which is parallel to the mirror $e$ and which reflects on the vertically placed focusing screen $i^2$ the rays of light coming from $e$.

I claim as my invention:

1. In a photographic camera, an objective lens, two compartments and a mirror in each compartment, the mirrors being set at an incline to the paths of the rays of light to and through the compartments and parallel to each other and the compartments being slidable the one within the other to regulate the distance between the said mirrors.

2. In a photographic camera, an objective lens, a compartment to the frame of which the objective lens is secured, a mirror in said compartment, a second compartment slidable within the first compartment, and a mirror in said second compartment parallel to the first aforesaid mirror, the light being reflected by said mirror from the objective lens to a photographic plate or film.

3. In a photographic camera, an objective lens, a compartment to the frame of which the objective lens is secured, a mirror in said compartment, a second compartment slidable within the first compartment, a mirror in said second compartment parallel to the first aforesaid mirror, the light being reflected by said mirrors from the objective lens to a photographic plate or film, a focusing screen, and means for turning back the mirror in the said second compartment to permit the light to reach the said focusing screen.

In testimony whereof I have affixed my signature in presence of two witnesses.

AUGUSTE VAUTIER-DUFOUR.

Witnesses:
 L. H. MUNIA,
 ROBT. WORTEMBERG.